United States Patent
Ogisu

(10) Patent No.: US 10,160,464 B2
(45) Date of Patent: Dec. 25, 2018

(54) ARTICLE TRANSPORT FACILITY

(71) Applicant: Daifuku Co., Ltd., Osaka-shi (JP)

(72) Inventor: Motonari Ogisu, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 251 days.

(21) Appl. No.: 15/196,106

(22) Filed: Jun. 29, 2016

(65) Prior Publication Data

US 2017/0002523 A1 Jan. 5, 2017

(30) Foreign Application Priority Data

Jun. 30, 2015 (JP) ................................. 2015-131608

(51) Int. Cl.
*B61B 3/02* (2006.01)

(52) U.S. Cl.
CPC ............ *B61B 3/02* (2013.01); *E01B 2202/02* (2013.01); *E01B 2202/08* (2013.01); *Y02T 30/30* (2013.01)

(58) Field of Classification Search
CPC .. B61B 3/00; B61B 3/02; B61B 10/00; B61B 13/00; B61B 13/04; B60L 13/00
See application file for complete search history.

(56) References Cited

FOREIGN PATENT DOCUMENTS

| JP | 61193105 U | | 12/1986 | |
|----|------------|---|---------|---|
| JP | 61232 A | | 1/1994 | |
| JP | H 061232 | * | 11/1994 | .............. B60L 13/00 |
| JP | 7172570 A | | 7/1995 | |

\* cited by examiner

*Primary Examiner* — Robert J McCarry, Jr.
(74) *Attorney, Agent, or Firm* — The Webb Law Firm

(57) ABSTRACT

An article transport facility includes an engaging member capable of being moved to an engaging position at which the engaging member is in engagement with a movable guide portion and with a fixed guide portion to hold the movable guide portion in the guiding position, and to a releasing position at which the engaging member is not in engagement with at least one of the movable guide portion and the fixed guide portion wherein the engaging member supports the movable guide portion from below when in the engaging position; an urging member for urging the engaging member; a holding device for generating an operating force with electric power supplied from an electric power supply to hold the engaging member in the engaging position against an urging force of the urging member; and a power-supply controller for controlling the operation of the electric power supply. The power-supply controller maintains electric power supply in an electric power supplying state while fire information is not outputted from a fire detector and switches the electric power supply to an electric power non-supplying state if fire information is outputted from the fire detector.

5 Claims, 7 Drawing Sheets

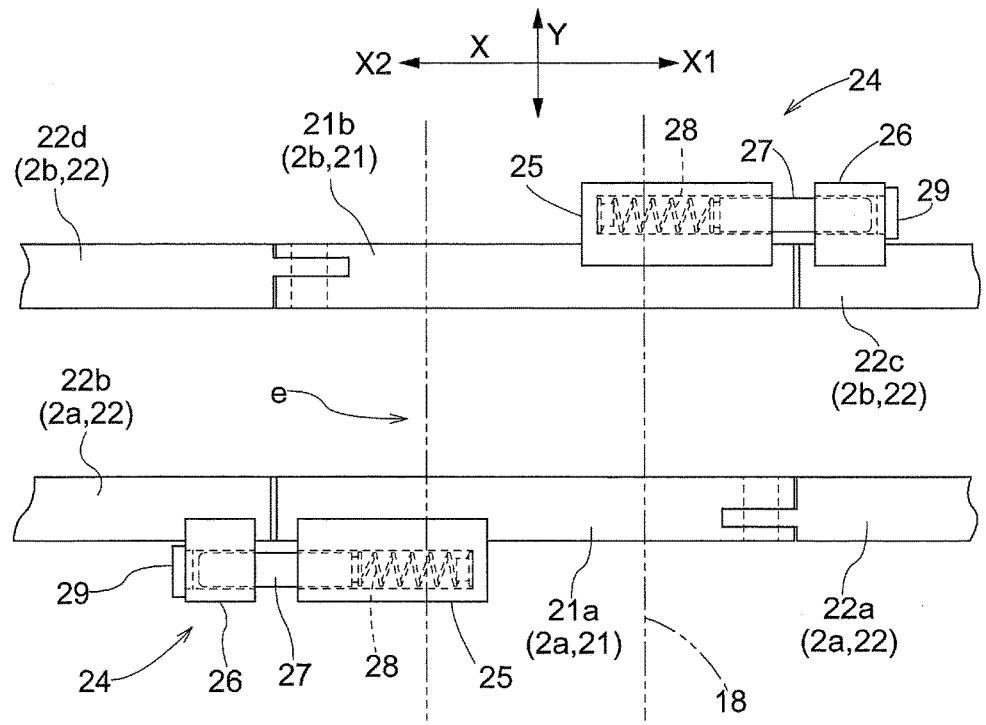
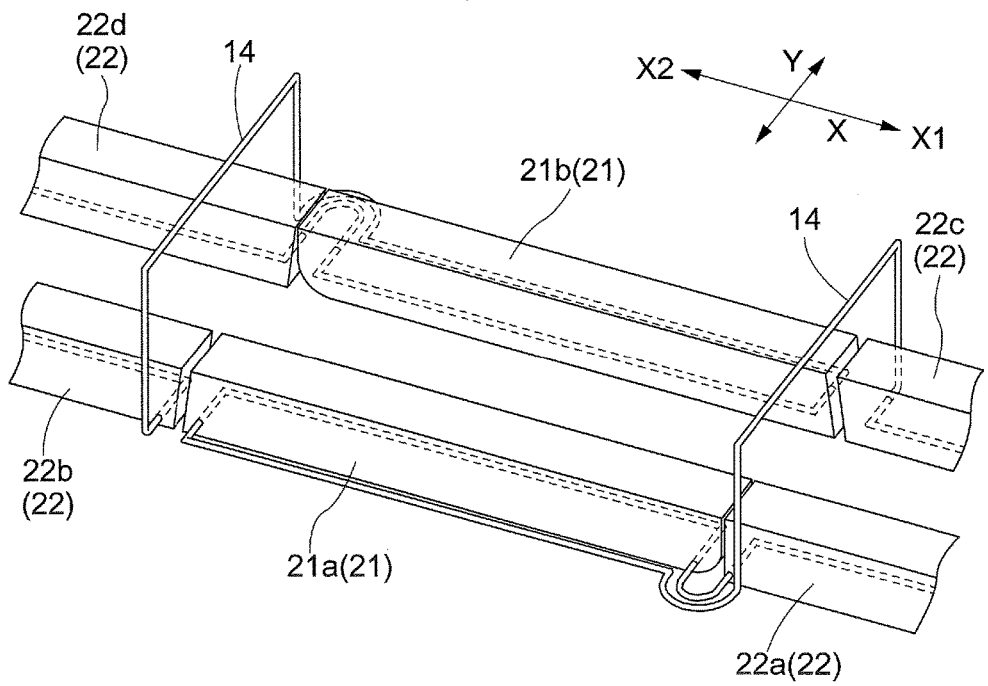

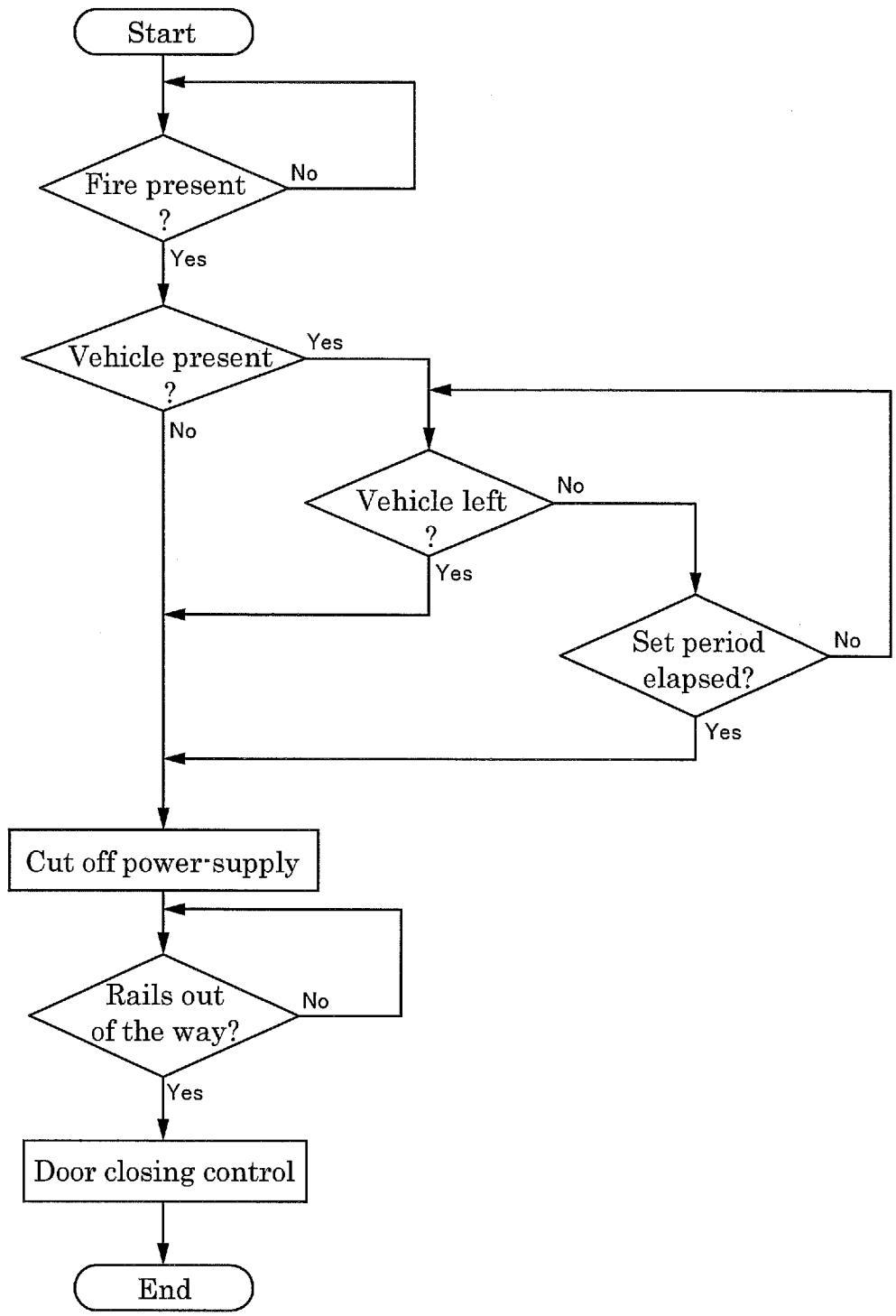

ARTICLE TRANSPORT FACILITY

CROSS-REFERENCE TO RELATED APPLICATION

This application claims priority to Japanese Patent Application No. 2015-131608 filed Jun. 30, 2015, the disclosure of which is hereby incorporated in its entirety by reference.

FIELD OF THE INVENTION

The present invention relates to an article transport facility comprising an article transport vehicle configured to travel along a travel path which extends through an opening formed in a wall, a guide rail for guiding the article transport vehicle along the travel path, a fire door for closing the opening through movement along a wall surface of the wall, wherein the guide rail includes a movable guide portion capable of being located at a door installation location which is a location along a path longitudinal direction at which the fire door is installed and a fixed guide portion including two portions, one of which is located on one side of the door installation location and the other of which is located on the other side of the door installation location, along the path longitudinal direction.

BACKGROUND

An example of article transport facilities such as one described above is described in JP Publication of Application No. H07-172570 (Patent Document 1). In the article transport facility of Patent Document 1, a movable guide portion of each guide rail includes a holding device (an electromagnet). And by causing the holding device to generate an operating force by supplying electric power to it, the movable guide portion is held in a guiding position by the operating force of the holding device. Here, the guiding position is a position in which the movable guide portion is adjacent to, and lined up with, a fixed guide portion.

And when a fire door needs to be closed, each movable guide portion is caused to be moved under its own weight to an out-of-the-way position for allowing passage of a fire door, by releasing the holding action by the holding device on the movable guide portion by removing the operating force of the holding device by stopping the supplying of the electric power to the holding device. As such, by arranging the movable guide portion to be moved from the guide position to the out-of-the-way position under its own weight by stopping the supplying of electric power to the electromagnet, the movable guide portion of the guide rail can be moved to its out-of-the-way position even if there is a power outage when a fire breaks out and the fire door needs to be closed.

SUMMARY OF THE INVENTION

In the article transport facility of the Patent Document 1 described above, each movable guide portion is supported and held in position by the operating force of the holding device to prevent the movable guide portion from moving to the out-of-the-way position under its own weight. Thus, the movable guide portion is held in position to prevent its movement to the out-of-the-way position by the operating force of the holding device; thus, as the electric power supplied to the holding device, sufficient electric power is required to generate an operating force that can hold the movable guide portion located in the guiding position to prevent the movable guide portion from falling from the guiding position under its own weight.

And with increased demand for power-saving measures in recent years, an article transport facility is desired in which a movable guide portion of a guide rail can be held in its guiding position while reducing the amount of electric power supplied to the holding device.

Thus, an article transport facility is desired in which a movable guide portion of a guide rail can be held in its guiding position while reducing the amount of electric power supplied to the holding device.

An arrangement of the article transport facility provided in light of the above comprises an article transport vehicle configured to travel along a travel path which extends through an opening formed in a wall, a guide rail for guiding the article transport vehicle along the travel path, a fire door for closing the opening through movement along a wall surface of the wall, wherein the guide rail includes a movable guide portion capable of being located at a door installation location which is a location along a path longitudinal direction at which the fire door is installed and a fixed guide portion including two portions, one of which is located on one side of the door installation location and the other of which is located on the other side of the door installation location, along the path longitudinal direction, wherein the movable guide portion is configured to be moved to a guiding position in which the movable guide portion is located at the door installation location, is adjacent to, and lined up with, the fixed guide portion, and to an out-of-the-way position in which the movable guide portion has been moved out of the door installation location for allowing passage of the fire door, wherein the movable guide portion is moved from the guiding position to the out-of-the-way position under a weight of the movable guide portion.

The article transport facility further comprises an engaging member capable of being moved to an engaging position at which the engaging member is in engagement with the movable guide portion in the guiding position and with the fixed guide portion to hold the movable guide portion in the guiding position, and to a releasing position at which the engaging member is not in engagement with at least one of the movable guide portion and the fixed guide portion, along a direction that intersects a direction in which the movable guide portion is moved from the guiding position under the weight of the movable guide portion wherein the engaging member supports the movable guide portion from below when in the engaging position, an urging member for urging the engaging member from the engaging position toward the releasing position, a holding device for generating an operating force with electric power supplied from an electric power supply to hold the engaging member in the engaging position against an urging force of the urging member, a power-supply controller for controlling operation of the electric power supply, and a fire detector for detecting a fire, wherein the power-supply controller controls the operation of the electric power supply to: maintain an electric power supplying state in which electric power is supplied from the electric power supply to the holding device while fire information which indicates a presence of a fire is not outputted from the fire detector; and to switch to an electric power non-supplying state in which electric power is not supplied from the electric power supply to the holding device if the fire information is outputted from the fire detector.

With the arrangement described above, while the fire information is not outputted from the fire detector, electric power is supplied from the electric power supply to the holding device causing the holding device to generate an operating force that is greater than the urging force of the urging member so that the engaging member is held in the engaging position by the operating force of the holding device and so that the movable guide portion of the guide rail is supported and held in the guiding position by the engaging member in the engaging position.

And when the fire information is outputted from the fire detector, the electric power is no longer supplied from electric power supply to the holding device causing the holding device to stop generating the operating force, which in turn causes the engaging member to be moved from the engaging position to the releasing position by the urging force of the urging member. And with such movement of the engaging member to the releasing position, the movable guide portion of the guide rail is moved to its out-of-the-way position under its own weight.

The movable guide portion of the guide rail is supported by the engaging member in the engaging position. And the holding device holds the engaging member in its engaging position against the urging force of the urging member which urges the engaging member from the engaging position toward the releasing position. Thus, the operating force of the holding device only needs to be strong enough to hold the engaging member in the engaging position against the urging force of the urging member, and the operating force can be smaller than in the case where the guide rail for guiding the article transport vehicle is held in the guiding position by directly supporting the guide rail; so the electric power supplied to the holding device can be reduced. As such, the movable guide portion of the guide rail can be held in its guiding position while reducing the amount of electric power supplied to the holding device.

BRIEF DESCRIPTION OF THE DRAWINGS

FIG. 4 is a plan view of the door installation location, FIG. 5 is a diagram showing wiring of electricity supply lines, FIG. 10 is a flowchart.

DETAILED DESCRIPTION

Embodiments of an article transport facility are described next with reference to the drawings.

Figure 1:
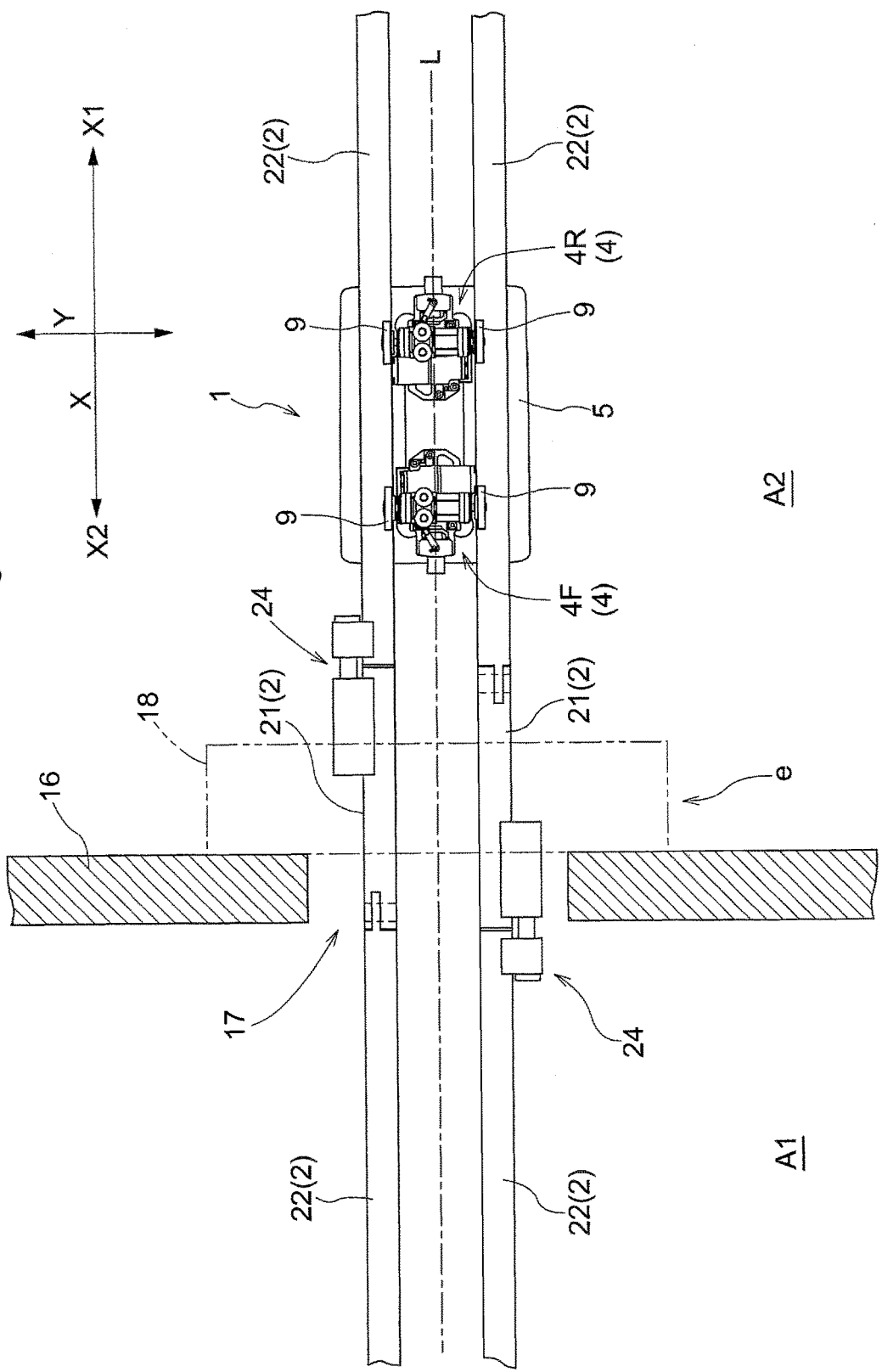
FIG. 1 is a plan view of a principal portion of an article transport facility.
Figure 2:
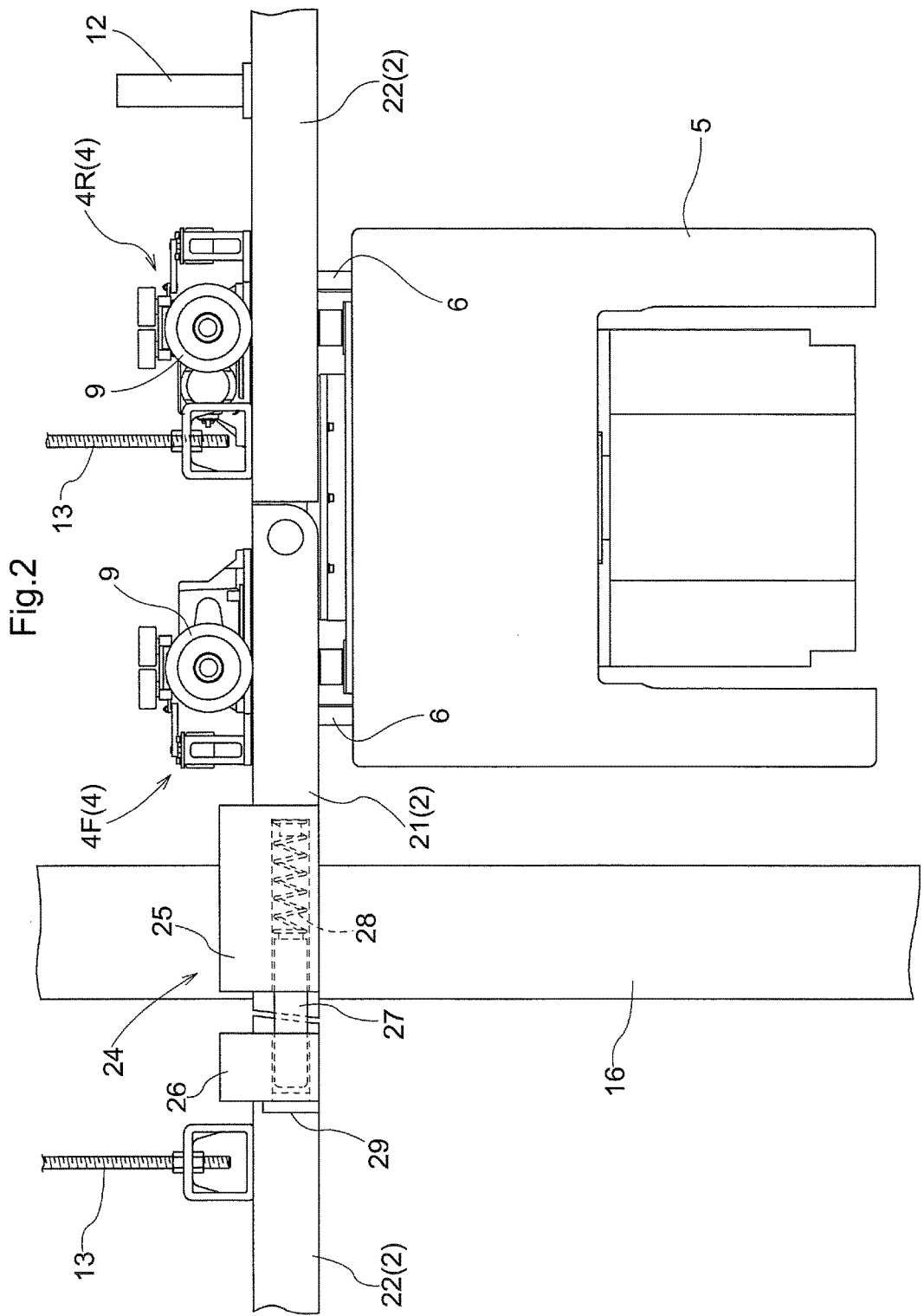
FIG. 2 is a side view of an article transport vehicle and a location at which a door is installed (door installation location)
Figure 3:
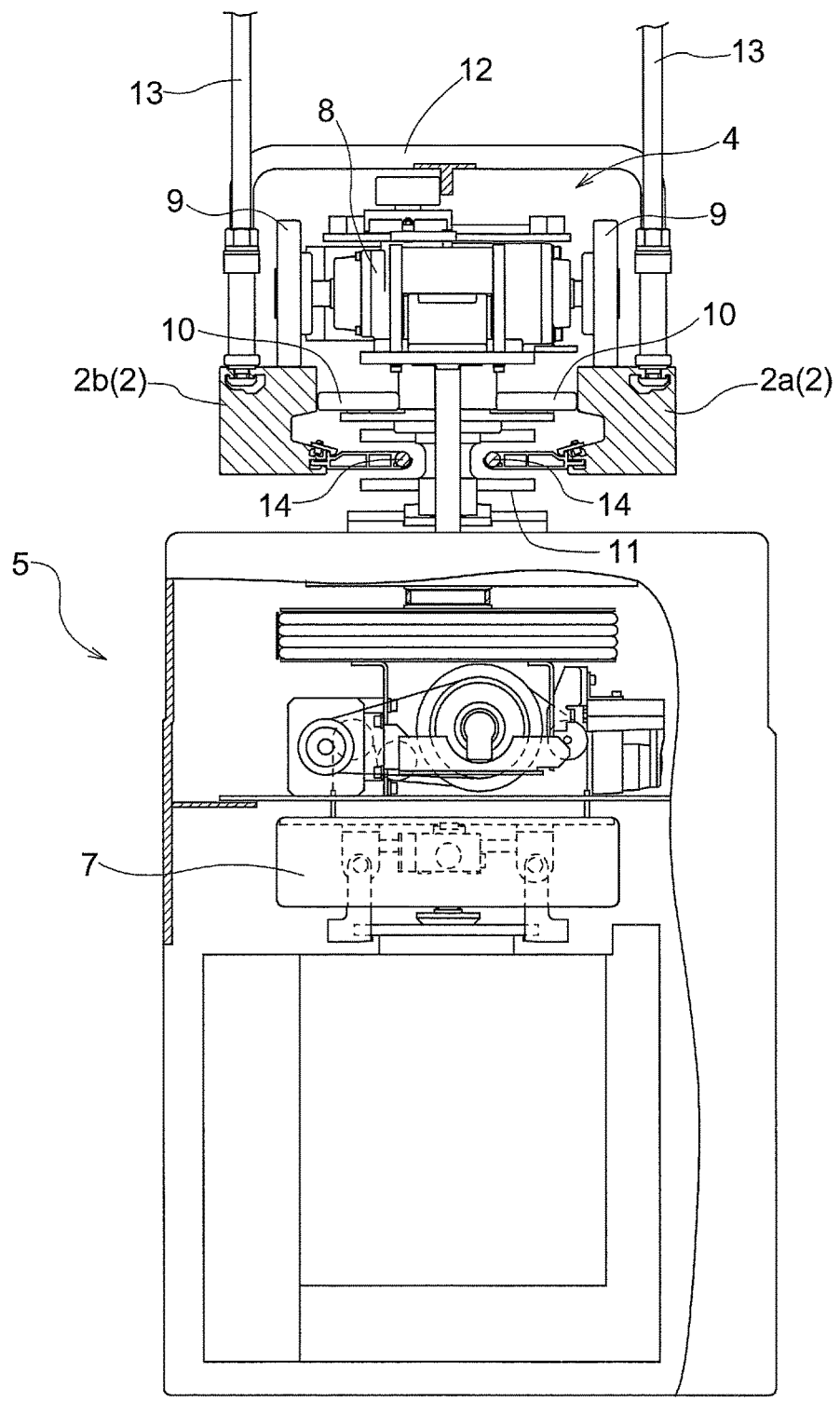
FIG. 3 is a front view of the article transport vehicle.

As shown in FIGS. 1-3, an article transport facility includes one or more article transport vehicles 1 each of which travels only in a forward travel direction along a travel path L to transport articles one article at a time, and guide rails 2 for guiding the article transport vehicle 1 along the travel path L.

Note that, in the following description, one direction (reverse travel direction of the article transport vehicle 1) along a path longitudinal direction X along the travel path L will be referred to as the first direction X1 whereas the other and opposite direction (forward travel direction of the article transport vehicle 1) along the path longitudinal direction X will be referred to as the second direction X2, and, in addition, the right direction and the left direction are defined as seen from the back toward the front of the article transport vehicle 1.

As shown in FIGS. 2 and 3, each article transport vehicle 1 includes a travel portion 4 which travels on and along guide rails 2 which are suspended from and supported by the ceiling, a vehicle main body 5 which is located below the guide rails 2 and is suspended from and supported by the travel portion 4, and connecting portions 6 for connecting the travel portion 4 and the vehicle main body 5 to each other. As shown in FIG. 3, the vehicle main body 5 includes a support portion 7 for supporting an article with the article suspended from the support portion 7. Note that, in the present embodiment, each article is a FOUP (Front Opening Unified Pod) for holding and carrying one or more semiconductor substrates.

The travel portion 4 includes a front travel portion 4F and a back travel portion 4R which are spaced apart from each other along a vehicle body fore and aft direction.

And the vehicle main body 5 is connected to each of the pair of front and back connecting portions 6 such that the vehicle main body 5 can be pivoted or rotated relative to the connecting portion 6 about a vertical axis. And each of the front travel portion 4F and the back travel portion 4R is configured to be pivoted or rotated about a vertical axis integrally with the connecting portion 6 connected thereto. As shown in FIG. 3, the guide rails 2 include a first rail member 2a and a second rail member 2b which are space apart from each other along a right and left direction (path width direction Y). In the following description, the first rail member 2a and the second rail member 2b will be referred to as a pair of right and left rail members. The pair of front and back connecting portions 6 are located between the pair of right and left rail members.

The front travel portion 4F is equipped with a pair of right and left travel wheels 9 which are driven and rotated by an electric-powered actuating motor 8 such that the travel wheels 9 travel on travel surfaces formed by respective top surfaces of the pair of right and left rail members. In addition, the front travel portion 4F is equipped with pairs of right and left guide wheels 10, with each guide wheel being rotatable about an axis extending along a vehicle body vertical direction (a vertical axis), such that the guide wheels 10 are in contact with inward surfaces of the pair of right and left rail members. Note that two pairs of right and left guide wheels 10 are provided to the front travel portion 4F with one pair spaced apart from the other pair along the vehicle body fore and aft direction.

Note that the back travel portion 4R is equipped with one pair of right and left travel wheels 9 and two pairs of right and left guide wheels 10, as in the case of the front travel portion 4F.

As such, each article transport vehicle 1 includes pairs of right and left travel wheels 9, and each member of the pair of right and left rail members includes a travel surface on which the travel wheels 9 of the article transport vehicle 1 roll on.

Provided on the top surface of the vehicle main body 5 is a power-receiving portion 11 to which driving electric power is supplied, without contact, from an electricity supply line 14 installed along each of the pair of right and left rail members. This power-receiving portion 11 is located between the pair of front and back connecting portions 6 along the vehicle body fore and aft direction, and between the pair of right and left rail members.

The article transport vehicle 1 is configured to travel along the guide rails 2 by virtue of the fact that the travel wheels 9 of the front travel portion 4F and of the back travel portion 4R are driven and rotated while the position along the vehicle body lateral direction is restricted by virtue of the fact that the guide wheels 10 of the front travel portion 4F and of the back travel portion 4R are guided by the pair of right and left rail members.

As shown in FIG. 3, the pair of right and left rail members are connected to each other by rail connecting members 12 each generally having an inverted U-shape (or a bracket-shape that opens downward) as seen along the path longitudinal direction X, and are also suspended from and supported by the ceiling through rail support members 13.

The article transport facility so configured is installed such that it takes up space in, and also extends between, a first area A1 and a second area A2, as shown in FIG. 1. And the first area A1 and the second area A2 are set up as clean rooms.

Provided in the boundary area between the first area A1 and the second area A2 is a wall 16 which acts as a partition between the first area A1 and the second area A2, and a fire door 18 which opens and closes an opening 17 formed in the wall 16. The fire door 18 is configured to be movable between a closing position for closing the opening 17 and an open position for leaving the opening 17 open, through movement (i.e., by being moved) along the vertical direction along the wall 16 (by means of any conventional actuating mechanism for linearly moving such door, such as a combination of a motor, a gear, and a rack that meshes with the gear, etc.). Thus, the article transport facility includes a the fire door 18 for closing the opening 17 through movement (i.e., by being moved) along the wall surface of the wall 16.

As shown in FIGS. 1 and 4, the pair of right and left rail members are installed such that they extend through the opening 17, and through the first area A1 and the second area A2. The guide rails 2 so installed include movable guide portions 21 each capable of being located at a door installation location e which is a location (along the path longitudinal direction X of the travel path L) at which the fire door 18 is installed, and fixed guide portions 22 each of which includes two portions (upstream-side fixed guide portion and downstream-side fixed guide portion described below) with one on each side of the door installation location e along the path longitudinal direction X.

Each movable guide portion 21 is configured to be moved to a guiding position in which the movable guide portion 21 is located at the door installation location e (which means that at least a part of the movable guide portion 21 is located in the door installation location) and is adjacent to, and lined up with, the fixed guide portions 22, and to an out-of-the-way position in which the movable guide portion 21 has been moved out of the door installation location e to allow passage of the fire door 18, and further is configured to be moved from the guiding position to the out-of-the-way position under the weight of the movable guide portion 21 itself. Here, "adjacent" means proximity and may or may not imply contact.

The pair of right and left rail members are described in more detail next, in which the rail member of the pair of right and left rail members that is located on one side along the path width direction Y (right and left direction) will be referred to as the first rail member 2a whereas the rail member of the pair of right and left rail members that is located on the other side along the path width direction Y (right and left direction) will be referred to as the second rail member 2a.

In addition, the movable guide portion 21 of the first rail member 2a will be referred to as the first movable guide portion 21a whereas the movable guide portion 21 of the second rail member 2b will be referred to as the second movable guide portion 21b. In other words, the movable guide portions 21 include the first movable guide portion 21a of the first rail member 2a and the second movable guide portion 21b of the second rail member 2b. Further, a portion of the first rail member 2a (i.e., a portion of the fixed guide portion 22) that is adjacent to, lined up with, and extends away in the first direction X1 from, the first movable guide portion 21a will be referred to as the first upstream-side fixed guide portion 22a whereas a portion of the first rail member 2a (i.e., a portion of the same fixed guide portion 22) that is adjacent to, lined up with, and extends away in the second direction X2 from, the first movable guide portion 21a will be referred to as the first downstream-side fixed guide portion 22b. And, a portion of the second rail member 2b (i.e., a portion of the fixed guide portion 22) that is adjacent to, lined up with, and extends away in the first direction X1 from, the second movable guide portion 21b will be referred to as the second upstream-side fixed guide portion 22c whereas a portion of the second rail member 2b (i.e., a portion of the same fixed guide portion 22) that is adjacent to, lined up with, and extends away in the second direction X2 from, the second movable guide portion 21b will be referred to as the second downstream-side fixed guide portion 22d. That is, the fixed guide portion 22 includes the first fixed guide portions of the first rail member 2a and the second fixed guide portions of the second rail member 2b. And the first fixed guide portion includes the first upstream-side fixed guide portion 22a and the first downstream-side fixed guide portion 22b whereas the second fixed guide portion includes the second upstream-side fixed guide portion 22c and the second downstream-side fixed guide portion 22d.

As shown in FIG. 4, the first movable guide portion 21a is arranged to be pivotable about a pivot axis which extends along the path width direction Y and which is located in an end portion of the first movable guide portion 21a that is on the first direction X1 side. The end surface of the first movable guide portion 21a that is on the second direction X2 side is formed to be a sloped surface that faces upward when the first movable guide portion 21a is in the guiding position whereas the end surface of the first downstream-side fixed guide portion 22b that is on the first direction X1 side is formed to be a sloped surface that faces downward.

When the first movable guide portion 21a is in the guiding position, the end surface of the first movable guide portion 21a that is on the second direction X2 side overlaps with the end surface of the first downstream-side fixed guide portion 22b that is on the first direction X1 side as seen along a vertical direction; thus, any further upward pivoting of the first movable guide portion 21a from and beyond the guiding position is restricted or prevented through contact with the first downstream-side fixed guide portion 22b.

And the first movable guide portion 21a is configured to be moved from the guiding position to the out-of-the-way position through a downward pivoting movement from the guiding position about the pivot axis, under its own weight. This out-of-the-way position is a position in which the entire first movable guide portion 21a is located toward the first direction X1 with respect to the door installation location e.

The second movable guide portion 21b is arranged to be pivotable about a pivot axis which extends along the path width direction Y and which is located in an end portion of the second movable guide portion 21a that is on the second direction X2 side. The end surface of the second movable guide portion 21b that is on the first direction X1 side is formed to be a sloped surface that faces upward when the second movable guide portion 21b is in the guiding position whereas the end surface of the second upstream-side fixed guide portion 22c that is on the second direction X2 side is formed to be a sloped surface which faces downward.

When the second movable guide portion 21b is in the guiding position, the end surface of the second movable guide portion 21b that is on the first direction X1 side overlaps with the end surface of the second upstream-side fixed guide portion 22c that is on the second direction X2 side as seen along a vertical direction; thus, any further upward pivoting of the second movable guide portion 21b from and beyond the guiding position is restricted or prevented through contact with the second upstream-side fixed guide portion 22c.

And the second movable guide portion 21b is configured to be moved from the guiding position to the out-of-the-way position through a downward pivoting movement from the guiding position about the pivot axis, under its own weight. This out-of-the-way position is a position in which the entire second movable guide portion 21b is located toward the second direction X2 with respect to the door installation location e.

The movable guide portions 21 (the first movable guide portion 21a and the second movable guide portion 21b) that are arranged in the manner described above are configured to be moved to the guiding positions in which the movable guide portions 21 are located at the door installation location e and are adjacent to and lined up with the fixed guide portions 22, and to the out-of-the-way positions in which the movable guide portions 21 have been moved out of the door installation location e to allow passage of the fire door 18, and further are configured to be moved from the guiding positions to the out-of-the-way positions under the weight of the movable guide portions 21 themselves.

The first upstream-side fixed guide portion 22a and the second upstream-side fixed guide portion 22c are so arranged and located that the end of the first upstream-side fixed guide portion 22a that is on the second direction X2 side and the end of the second upstream-side fixed guide portion 22c that is on the second direction X2 side are located at the same position along the path longitudinal direction X.

In addition, the first downstream-side fixed guide portion 22b and the second downstream-side fixed guide portion 22d are so arranged and located that the end of the first downstream-side fixed guide portion 22b that is on the first direction X1 side and the end of the second downstream-side fixed guide portion 22d that is on the first direction X1 side are located at the same position along the path longitudinal direction X.

As shown in FIG. 5, each member of the pair of right and left rail members is provided with an electricity supply line 14 that extends generally along the path longitudinal direction X, for supplying operating electric power to the article transport vehicle 3.

The electricity supply line 14 provided to the first upstream-side fixed guide portion 22a, the electricity supply line 14 provided to the first movable guide portion 21a, and the electricity supply line 14 provided to the second upstream-side fixed guide portion 22c form one continuous supply line. In addition, the electricity supply line 14 provided to the second downstream-side fixed guide portion 22d, the electricity supply line 14 provided to the second movable guide portion 21b, and the electricity supply line 14 provided to the first downstream-side fixed guide portion 22b form one continuous supply line.

Thus, the electricity supply line 14 provided to the first movable guide portion 21a is connected with the electricity supply line 14 provided to the first upstream-side fixed guide portion 22a, and is disconnected from the electricity supply line 14 provided to the first downstream-side fixed guide portion 22b.

In addition, the electricity supply line 14 provided to the second movable guide portion 21b is connected with the electricity supply line 14 provided to the second downstream-side fixed guide portion 22d, and is disconnected from the electricity supply line 14 provided to the second upstream-side fixed guide portion 22c.

The article transport facility is provided with holding mechanisms 24 for holding the movable guide portions 21 of the guide rails 2 in respective guiding positions. The holding mechanisms 24 are described next.

Although one holding mechanism 24 is provided to each of the first movable guide portion 21a and the second movable guide portion 21b, the holding mechanism 24 provided to the first movable guide portion 21a and the holding mechanism 24 provided to the second movable guide portion 21b have the same structure; thus, only the holding mechanism 24 provided to the first movable guide portion 21a is described below.

The holding mechanism 24 includes a first engaged portion 25, a second engaged portion 26, an engaging member 27, a coil spring 28, and an electromagnet 29 which functions as a holding device. The first engaged portion 25 is fixed to an end portion of the first movable guide portion 21a that is on the second direction X2 side. The second engaged portion 26 is fixed to an end portion of the first downstream-side fixed guide portion 22b that is on the first direction X1 side. The engaging member 27 is provided and arranged such that it engages both the first engaged portion 25 and the second engaged portion 26 when the engaging member 27 is in the engaging position. The coil spring 28 is provided to function as an urging member for urging the engaging member 27 from the engaging position toward its releasing position. The electromagnet 29 is provided as a holding device for pulling and holding a distal end portion 27a of the engaging member 27 by its magnetic force to hold the engaging member 27 in its engaging position.

A proximal end portion 27b of the engaging member 27 is always in engagement with the first engaged portion 25 for relative sliding movement along the longitudinal direction of the first movable guide portion 21a. The engaging member 27 is configured to be moved to the engaging position in which the amount of projection of the engaging member 27 from the first engaged portion 25 is greater than in the releasing position, and to a releasing position in which the amount of projection of the engaging member 27 from the first engaged portion 25 is less than in the engaging position, through sliding movement of the proximal end portion 27b within the first engaged portion 25 and along the longitudinal direction of the first movable guide portion 21a.

The coil spring 28 is installed within the first engaged portion 25 such that it is in a tensioned state so as to urge the engaging member 27 from its engaging position toward its releasing position.

And the distal end portion 27a of the engaging member 27 engages the second engaged portion 26 by moving the engaging member 27 to the engaging position by moving the engaging member 27 along the path longitudinal direction X with the first movable guide portion 21a of the guide rail 2 (first rail member 2a) in the guiding position. Since magnetic force is generated by the electromagnet 29 when electric power is supplied from an electric power supply 34 to the electromagnet 29, this magnetic force holds the engaging member 27 in the engaging position against the urging force of the coil spring 28. When the engaging member 27 is engaging both the first engaged portion 25 and the second engaged portion 26 in this manner, the first movable guide portion 21a is supported from below by this engaging member 27 so that the first movable guide portion 21a is held in the guiding position. Here, the expression "the first movable guide portion 21a is supported from below" means that a downward surface formed in the first movable guide portion 21a itself or in a member fixed to the first movable guide portion 21a is supported from below. In the present example, the surface to be supported is a part of inner circumferential surface of an engaging recess portion 25a described below.

Incidentally, when the engaging member 27 is in the engaging position, the distal end side of the engaging member 27 is in engagement with the second engaged portion 26 fixed to the first downstream-side fixed guide portion 22b whereas the proximal end side of the engaging member 27 is in engagement with the first engaged portion 25 fixed to the first movable guide portion 21a. Thus, this engaging position is, or corresponds to, the position for holding the movable guide portion 21 in the guiding position by engaging the movable guide portion 21 in the guiding position and the fixed guide portion 22.

In addition, when the engaging member 27 is in the releasing position, the distal end side of the engaging member 27 does not engage the second engaged portion 26 fixed to the first downstream-side fixed guide portion 22b. Thus, this releasing position is, or corresponds to, the position in which the engaging member 27 is not in engagement with at least one of the movable guide portion 21 and the fixed guide portion 22 (i.e., with the fixed guide portion 22 in the present embodiment).

And the engaging member 27 is configured to be movable along a horizontal direction (path longitudinal direction X) which intersects the vertical and downward direction in which the movable guide portion 21 moves from the guiding position under its own weight.

Figure 6:
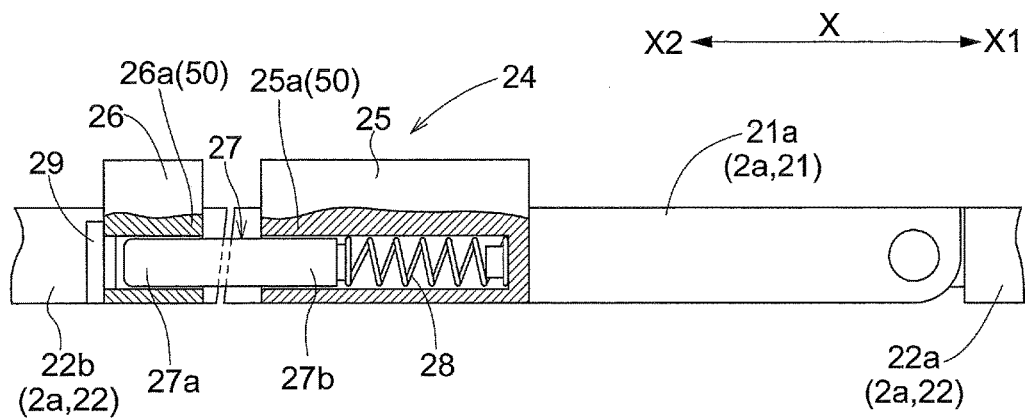
FIG. 6 shows a state in which a movable guide portion of a guide rail is located in a guiding position.

And, as shown in FIG. 6, the engaging member 27 engages the second engaged portion 26 by moving the engaging member 27 from the releasing position to the engaging position with the movable guide portion 21 of the guide rail 2 in the guiding position. When the engaging member 27 is engaging the second engaged portion 26, the first movable guide portion 21a is restricted or prevented from being moved from the guiding position toward the out-of-the-way position. This state of the engaging member 27 being held in the guiding position is maintained by the magnetic force of the electromagnet 29.

Figure 7:
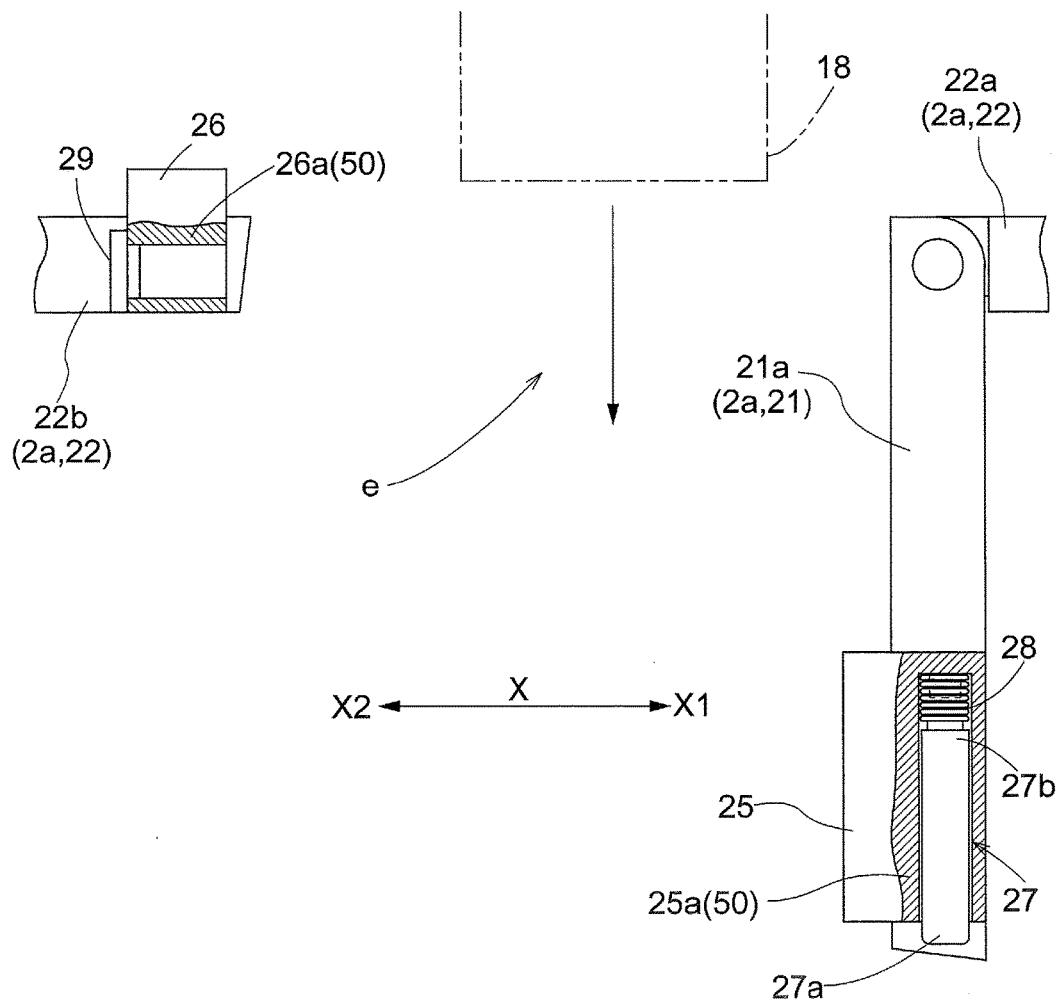
FIG. 7 shows a state in which the movable guide portion of the guide rail is located in an out-of-the-way position.

And if and when the supply of electric power from the electric power supply 34 to the electromagnet 29 is cut off when the engaging member 27 is held in the engaging position by the magnetic force of the electromagnet 29, the magnetic force generated by the electromagnet 29 stops existing; thus, as shown in FIG. 7, the engaging member 27 is moved from the engaging position to the releasing position by the urging force of the coil spring 28, allowing the first movable guide portion 21a to be moved to the out-of-the-way position under its own weight.

And each engaging member 27 is configured such that it can be moved from the engaging position to the releasing position by the urging force of the coil spring 28 when the magnetic force of the electromagnet 29 is not acting on the engaging member 27 and when no travel wheels 9 of the article transport vehicle 1 are on the first movable guide portion 21a and such that the engaging member 27 is not moved from the engaging position to the releasing position by the urging force of the coil spring 28 when one or more of the travel wheels 9 of the article transport vehicle 1 are on the first movable guide portion 21a, even when the magnetic force of the electromagnet 29 is not acting on the engaging member 27.

To describe in more detail, the engaging member 27 is formed to have a shape of a circular cylinder. The second engaged portion 26 has an engaging recess portion 26a which the distal end portion 27a (which is, or corresponds to, the inserted portion) of the engaging member 27 is inserted to and engages. The first engaged portion 25 has an engaging recess portion 25a which the proximal end portion 27b of the engaging member 27 is inserted and engages. The distal end portion 27a of the engaging member 27 has a tapered shape in which the distal end side has a smaller transverse dimension than the proximal end side along an inserting direction.

The engaging recess portion 25a of the first engaged portions 25 and the engaging recess portion 26a of the second engaged portion 26 together form a slide path 50 formed in, and extending at least partially through, the fixed guide portion 22 and the movable guide portion 21.

As shown in FIG. 2, when one or more of the travel wheels 9 of the article transport vehicle 1 are on the first movable guide portion 21a, the frictional force between the engaging member 27 and the slide path 50 becomes greater than when none of the travel wheels 9 are on the first movable guide portion 21a. The urging force of the coil spring 28 is set to be greater than the frictional force between the engaging member 27 and the slide path 50 when none of the travel wheels 9 of the article transport vehicle 1 are on the first movable guide portion 21a, and is set to be less than the frictional force between the engaging member 27 and the slide path 50 when one or more of the travel wheels 9 of the article transport vehicle 1 are on the first movable guide portion 21a.

Accordingly, when none of the travel wheels 9 of the article transport vehicle 1 are on the first movable guide portion 21a, the engaging member 27 is moved from the engaging position to the releasing position by the urging force of the coil spring 28 against the frictional force between the engaging member 27 and the slide path 50. In addition, when one or more of the travel wheels 9 of the article transport vehicle 1 are on the first movable guide portion 21a, the engaging member 27 is held in the engaging position by the frictional force between the engaging member 27 and the slide path 50 against the urging force of the coil spring 28.

The electric power supply 34 provided to the article transport facility is described next.

Figure 8:
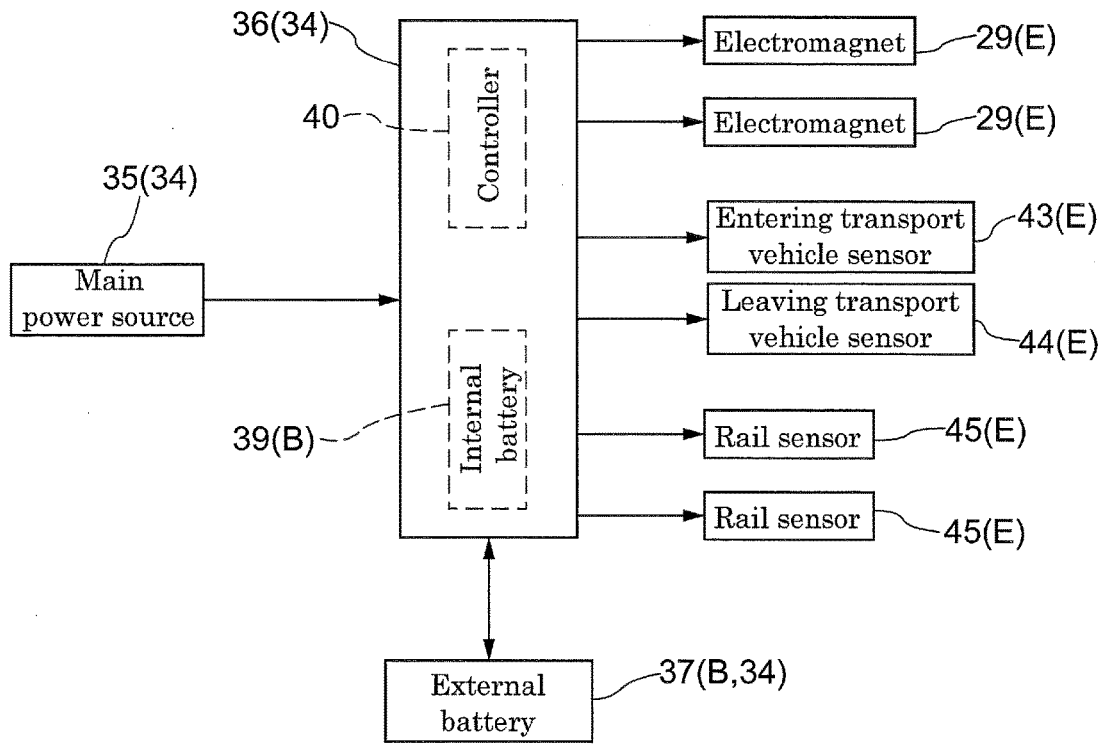
FIG. 8 is block diagram showing how electric power is supplied to various components.

As shown in FIG. 8, the electric power supply 34 includes an uninterruptible power source 36, which is installed in an intermediate location in an electric power supply route for supplying electric power from a main power source 35 to the devices E to which electric power needs to be supplied, such as, among other things, the electromagnet 29 and various sensors.

This uninterruptible power source 36 includes therein an internal battery 39 and a controller 40, and is connected to an external battery 37. The external battery 37 and the internal battery 39 form an electricity storage B. The controller 40 is configured to be able to determine if there is an abnormal condition in the main power source 35 based on voltage etc. of the electric power supplied from the main power source 35, and thus functions as a main power supply abnormal condition detector for detecting any abnormal condition of the main power source 35.

As such, the electric power supply 34 includes the main power source 35, the electricity storage B, and the controller 40 which detects any abnormal condition of the main power source 35.

And when the electric power is properly supplied from the main power source 35, the uninterruptible power source 36 is configured: to supply, under the control of the controller 40, the electric power from the main power source 35 to the devices E to which the electric power needs to be supplied; and also to store electricity in the internal battery 39 and the external battery 37. In addition, the uninterruptible power source 36 is configured to supply electric power to the devices E to which electric power needs to be supplied, from the electricity storage B when the controller 40 detects that the electric power is not properly supplied from the main power source 35 (i.e., that an abnormal condition exists in the main power source 35) due to, for example, power outage, or an abnormality in the power-supply voltage, etc.

Figure 9:
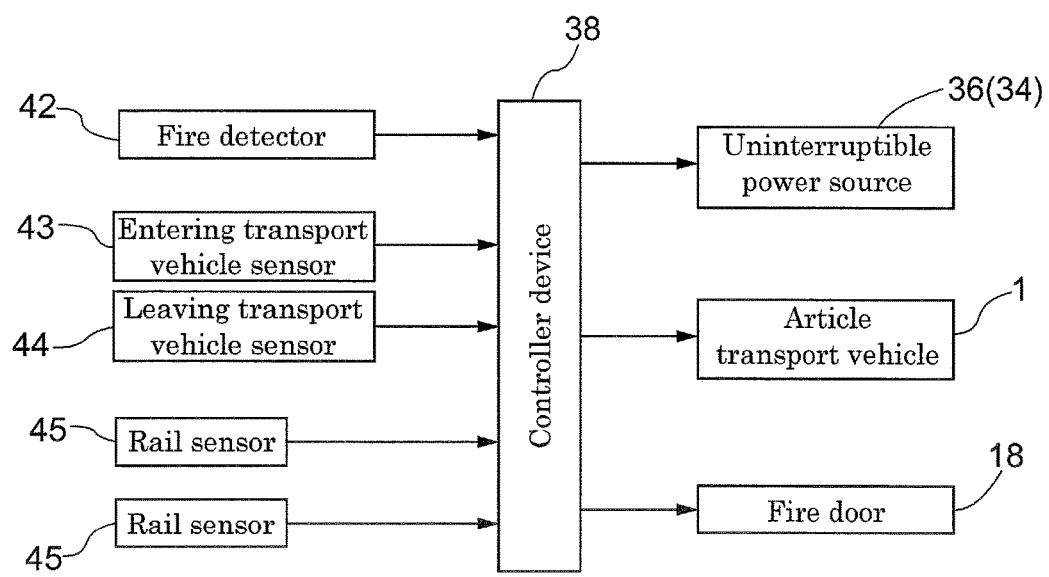
FIG. 9 is a control block diagram.

As shown in FIG. 9, the article transport facility has a controller device 38 which functions as a power-supply controller for controlling operation of the uninterruptible power source 36 from outside, and a fire detector 42 for detecting a fire.

The controller device 38 transmits a power supply stop command to the uninterruptible power source 36, when fire information which indicates an outbreak or presence of a fire is outputted from the fire detector 42. The controller 40 of the uninterruptible power source 36 is configured to stop the electric power supply to the electromagnet 29 based on the power supply stop command from the controller device 38, and to maintain the electric power supply to the devices E to which electric power needs to be supplied, other than the electromagnet 29.

As such, the controller device 38 is configured to control operation of the electric power supply 34 to: maintain an electric power supplying state in which electric power is supplied from the electric power supply 34 to the electromagnet 29 while fire information which indicates an outbreak (i.e., presence) of a fire from the fire detector 42 is not outputted; and to switch to an electric power non-supplying state in which electric power is not supplied from the electric power supply 34 to the electromagnet 29 if the fire information is outputted from the fire detector 42.

In addition, in the electric power supplying state, the electric power supply 34 is configured: to supply electric power to the electromagnet 29 from the main power source 35 or the electricity storage B; to supply electric power to the electromagnet 29 from the electricity storage B if an abnormal condition of the main power source 35 is detected by the controller 40, in the electric power supplying state; and not to supply electric power to the electromagnet 29 from either the main power source 35 or the electricity storage B, in an electric power non-supplying state.

The control by the controller device 38 is described in more detail next.

As shown in FIG. 9, the article transport facility has an entering transport vehicle sensor 43 for detecting an article transport vehicle 1 as it enters a monitored area which includes the door installation location e, a leaving transport vehicle sensor 44 for detecting an article transport vehicle 1 as it leaves the monitored area, and rail sensors 45 for detecting that the movable guide portions 21 of the guide rails 2 are located in the out-of-the-way positions.

The monitored area is defined or set up such that the entire movable guide portions 21 in the guiding positions are located within the monitored area in the path longitudinal direction X, and such that the travel wheels 9 of the article transport vehicle 1 would not be on the movable guide portions 21 unless the article transport vehicle 1 enters the monitored area.

The entering transport vehicle sensor 43 is installed in an entrance area of the monitored area whereas the leaving transport vehicle sensor 44 is installed in an exit area of the monitored area. The controller device 38 is configured to determine whether an article transport vehicle 1 exists in the monitored area based on detection information from the entering transport vehicle sensor 43 and the detection information from the leaving transport vehicle sensor 44.

To describe control by the controller device 38 with reference to the flowchart of FIG. 10, the controller device 38 is configured to issue a power supply stop command to the uninterruptible power source 36 if the controller device 38 determines that no article transport vehicle 1 exists in the monitored area after fire information has been inputted from the fire detector 42. Incidentally, when the controller device 38 issues the power supply stop command to the uninterruptible power source 36, the electric power supply to the electromagnet 29 from the uninterruptible power source 36 is interrupted and the electric power supply 34 is switched to the electric power non-supplying state. This causes the electromagnet 29 to lose its magnetic force, causing the engaging member 27 to be moved from the engaging position to the releasing position by the urging force of the coil spring 28, and causing the movable guide portion 21 to fall under its own weight to the out-of-the-way position.

In addition, if the controller device 38 determines that an article transport vehicle 1 is in the monitored area after the fire information has been inputted from the fire detector 42, the controller device 38 is configured to issue a power supply stop command to the uninterruptible power source 36 after the article transport vehicle 1 has passed through and left the monitored area. In addition, when a predetermined set period has elapsed after the fire information was inputted from the fire detector 42, the controller device 38 is configured to issue a power supply stop command to the uninterruptible power source 36 regardless of whether an article transport vehicle 1 exists in the monitored area.

And after the controller device 38 issues the power supply stop command to the uninterruptible power source 36 as described above, the controller device 38 is configured to control the operation of the fire door 18 to move the fire door 18 to its closed position if it is detected by the rail sensor 45 that both of the first movable guide portion 21a and the second movable guide portion 21b have been moved to respective out-of-the-way positions.

As such, the movable guide portions 21 can be moved to their respective out-of-the-way positions by switching the electric power supply 34 to the electric power non-supplying state in which electric power is not supplied to the electromagnet 29; thus, the movable guide portions 21 can be moved to the out-of-the-way positions, and the fire door 18 can be closed even when there is power outage due to a fire.

In addition, even when the electric power supply 34 is maintained in the electric power supplying state to hold the engaging member 27 in the engaging position because no fire has broken out, the magnetic force of the electromagnet 29 only needs to provide a sufficient force to resist the urging force of the coil spring 28; thus, electric power supplied to the electromagnet 29 can be reduced compared with the case where the movable guide portions 21 are held in the guiding positions directly by the magnetic force of the electromagnets 29.

Alternative Embodiments (1) In the embodiment described above, each engaging member 27 is arranged to be moved to the engaging position and to the releasing position by causing the engaging member 27 to be slid along the path longitudinal direction X (longitudinal direction of the movable guide portion 21) with the movable guide portion 21 in the guiding position. However, each engaging member 27 may be arranged to be moved to the engaging position and to the releasing position by causing the engaging member 27 to be slid along the path width direction Y (width direction of the movable guide portion 21) or to be pivoted about an axis that extends along the vertical direction (direction of thickness of the movable guide portion 21), with the movable guide portion 21 in the guiding position.

In addition, in the embodiment described above, the engaging member 27 is arranged such that it is always in engagement with the first engaged portion 25 of the movable guide portion 21 and such that it can be moved into, and out of, engagement with the second engaged portion 26 of the fixed guide portion 22. However, the engaging member 27 may be arranged such that it is always in engagement with the second engaged portion 26 of the fixed guide portion 22 and such that it can be moved into, and out of, engagement with the first engaged portion 25 of the movable guide portion 21 through a movement, such as a sliding or pivoting movement, of the engaging member 27.

(2) In the embodiment described above, the first movable guide portion 21a is pivotable about an axis located in the end portion on the first direction X1 side whereas the second movable guide portion 21b is pivotable about an axis located in the end portion on the second direction X2 side. However, both the first movable guide portion 21a and the second movable guide portion 21b may be arranged to be pivotable about respective axes located in respective end portions on the same side along the path longitudinal direction X.

In addition, in the embodiment described above, operating electric power is supplied to the article transport vehicle 1 through the electricity supply lines 14. However, the article transport vehicle 1 may be provided with a battery, which would supply the necessary operating electric power to the article transport vehicle.

(3) In the embodiment described above, a hole having a shape of a circular cylinder, into which the distal end portion 27a of the engaging member 27 is inserted, is formed in the second engaged portion 26. However, the shape of the portion of the second engaged portion 26 which the engaging member 27 engages may be changed as desired. More specifically, instead of forming an engaging recess portion 26a which is recessed downward in the lower portion of the second engaged portion 26 by forming a hole in the shape of a circular cylinder as described above, the second engaged portion 26 may be formed in a shape of, for example, a U with corners (or in a bracket shape that opens upward) as seen along the moving direction of the engaging member 27, to form the engaging recess portion 26a in the second engaged portion 26. In addition, the second engaged portion 26 may be formed in the shape of a flat plate so that the engaging member 27 engages the second engaged portion 26 by virtue of the fact that the distal end portion 27a of the engaging member 27 is placed on the second engaged portion 26.

(4) In the embodiment described above, the engaging member 27 is formed in a tapering shape; however, the engaging member 27 may have a shape of a circular or rectangular cylinder with a constant thickness or transverse dimension, or of a curved claw, etc. And as such, the shape of the engaging member 27 may be changed as desired.

(5) In the embodiment described above, the article transport vehicle 1 is configured to travel on the guide rails 2; however, the article transport vehicle 1 may be configured to travel on the floor surface. In addition, the guide rails 2 include a pair of right and left rail members to guide the article transport vehicle with the pair of right and left rail members in the embodiment described above. However, the guide rail 2 may include a single rail member so that the single rail member is used to guide the article transport vehicle.

(6) In the embodiment described above, the holding device includes the electromagnet 29 to hold the engaging member 27 in the engaging position by the magnetic force of the electromagnet 29 generated by supplying electric power to it. However, a holding device may be any device so long as it can generate an operating force to hold the engaging member 27 in its engaging position by supplying electric power to the device. For example, a holding device may include a suction device so that supplying electric power to the suction device would actuate its motor to generate a suction force which would then be used to hold the engaging member 27 in the engaging position.

(7) In the embodiment described above, the fire door 18 is configured to be moved to the closed position and to the open position through movement along the vertical direction. However, the fire door 18 may be configured to be moved to the closed position and to the open position through movement along a right and left direction or a horizontal direction.

(8) In the embodiment described above, the first movable guide portion 21a and the second movable guide portion 21b have the same length along the path longitudinal direction X. However, the first movable guide portion 21a and the second movable guide portion 21b may have mutually different lengths along the path longitudinal direction X. In addition, the first movable guide portion 21a and the second movable guide portion 21b are located at the same position along the path longitudinal direction X in the embodiment described above. However, the first movable guide portion 21a and the second movable guide portion 21b may be displaced relative to each other along the path longitudinal direction X.

Summary of Embodiments Described Above

A brief summary of the article transport facility described above is provided next.

An article transport facility comprises an article transport vehicle configured to travel along a travel path which extends through an opening formed in a wall, a guide rail for guiding the article transport vehicle along the travel path, a fire door for closing the opening through movement along a wall surface of the wall, wherein the guide rail includes a movable guide portion capable of being located at a door installation location which is a location along a path longitudinal direction at which the fire door is installed and a fixed guide portion including two portions, one of which is located on one side of the door installation location and the other of which is located on the other side of the door installation location, along the path longitudinal direction, wherein the movable guide portion is configured to be moved to a guiding position in which the movable guide portion is located at the door installation location, is adjacent to, and lined up with, the fixed guide portion, and to an out-of-the-way position in which the movable guide portion has been moved out of the door installation location for allowing passage of the fire door, wherein the movable guide portion is moved from the guiding position to the out-of-the-way position under a weight of the movable guide portion.

The article transport facility further comprises an engaging member capable of being moved to an engaging position at which the engaging member is in engagement with the movable guide portion in the guiding position and with the fixed guide portion to hold the movable guide portion in the guiding position, and to a releasing position at which the engaging member is not in engagement with at least one of the movable guide portion and the fixed guide portion, along a direction that intersects a direction in which the movable guide portion is moved from the guiding position under the weight of the movable guide portion wherein the engaging member supports the movable guide portion from below when in the engaging position, an urging member for urging the engaging member from the engaging position toward the releasing position, a holding device for generating an operating force with electric power supplied from an electric power supply to hold the engaging member in the engaging position against an urging force of the urging member, a power-supply controller for controlling operation of the electric power supply, and a fire detector for detecting a fire, wherein the power-supply controller controls the operation of the electric power supply to: maintain an electric power supplying state in which electric power is supplied from the electric power supply to the holding device while fire information which indicates a presence of a fire is not outputted from the fire detector; and to switch to an electric power non-supplying state in which electric power is not supplied from the electric power supply to the holding device if the fire information is outputted from the fire detector.

With the arrangement described above, while the fire information is not outputted from the fire detector, electric power is supplied from the electric power supply to the holding device causing the holding device to generate an operating force that is greater than the urging force of the urging member so that the engaging member is held in the engaging position by the operating force of the holding device and so that the movable guide portion of the guide rail is supported and held in the guiding position by the engaging member in the engaging position.

And when the fire information is outputted from the fire detector, the electric power is no longer supplied from electric power supply to the holding device causing the holding device to stop generating the operating force, which in turn causes the engaging member to be moved from the engaging position to the releasing position by the urging force of the urging member. And with such movement of the engaging member to the releasing position, the movable guide portion of the guide rail is moved to its out-of-the-way position under its own weight.

The movable guide portion of the guide rail is supported by the engaging member in the engaging position. And the holding device holds the engaging member in its engaging position against the urging force of the urging member which urges the engaging member from the engaging position toward the releasing position. Thus, the operating force of the holding device only needs to be strong enough to hold the engaging member in the engaging position against the urging force of the urging member, and the operating force can be smaller than in the case where the guide rail for guiding the article transport vehicle is held in the guiding position by directly supporting the guide rail; so the electric power supplied to the holding device can be reduced. As such, the movable guide portion of the guide rail can be held in its guiding position while reducing the amount of electric power supplied to the holding device.

Here, the electric power supply preferably includes a main power source, an electricity storage, and a main power supply abnormal condition detector for detecting an abnormal condition of the main power source, wherein the electric power supply is preferably configured: to cause electric power to be supplied from the main power source or the electricity storage to the holding device when in the electric power supplying state; to cause electric power to be supplied from the electricity storage to the holding device when an abnormal condition of the main power source is detected by the main power supply abnormal condition detector, when in the electric power supplying state; and to cause electric power to be not supplied either from the main power source or from the electricity storage to the holding device when in the electric power non-supplying state.

With the arrangement described above, even when the abnormal condition occurs in the main power source (due to a malfunction, etc. of the malfunction of the main power source) that prevents electric power from being supplied from the main power source to the holding device while the fire information is not outputted from the fire detector, this abnormal condition is detected by the main power supply abnormal condition detector, allowing the electricity storage to supply electric power to the holding device. Thus, even when an abnormal condition occurs in the main power source, the movable guide portion can be held in the guiding position by supplying electric power to the holding device from the electricity storage. Therefore, even when an abnormal condition occurs in the main power source when there is no fire, the movable guide portion of the guide rail can be prevented from moving from the guiding position under its own weight.

In addition, the guide rail preferably has a travel surface on which a travel wheel of the article transport vehicle rolls, wherein the engaging member is preferably configured, when the operating force of the holding device is not acting on the engaging member: to be movable from the engaging position to the releasing position under the urging force of the urging member when the travel wheel of the article transport vehicle is not on the movable guide portion; and not to move from the engaging position to the releasing position under the urging force of the urging member when the travel wheel of the article transport vehicle is on the movable guide portion.

With the arrangement described above, when the travel wheel of the article transport vehicle is on the movable guide portion, the engaging member does not move from the engaging position to the releasing position so that the movable guide portion remains supported by the engaging member even when the operating force of the holding device stops acting on the engaging member. Thus, the movable guide portion does not move from the guiding position.

Thus, even if electric power is no longer supplied to the holding device because the fire information is outputted from the fire detector or because an abnormal condition occurred in the electric power supply, the movable guide portion can still be prevented from moving from its guiding position under its own weight when the travel wheel of the article transport vehicle is on the movable guide portion, preventing the article transport vehicle from derailing from the guide rail.

In addition, the engaging member is preferably movable to the engaging position and to the releasing position by sliding along a slide path formed in, and extending at least partially through, the fixed guide portion and the movable guide portion, wherein the urging force of the urging member is preferably set to be greater than a frictional force between the engaging member and the slide path when the travel wheel of the article transport vehicle is not on the movable guide portion, and to be less than the frictional force between the engaging member and the slide path when the travel wheel of the article transport vehicle is on the movable guide portion.

With the arrangement described above, when the travel wheel of the article transport vehicle is not on the movable guide portion, the engaging member is moved to the releasing position against the frictional force by the urging force of the urging member when the operating force of the holding device stops acting, allowing the movable guide member to be moved from the guiding position to the out-of-the-way position.

And when the travel wheel of the article transport vehicle is on the movable guide portion, the weight of the article transport vehicle is supported by the engaging member, which increases the frictional force between the engaging member and the slide path. Since this causes the frictional force to be greater than the urging force of the urging member, the engaging member is held in the engaging position even when the operating force of the holding device stops acting on the engaging member, thus, preventing the movable guide portion from moving from the guiding position.

As such, when the travel wheel of the article transport vehicle is on the movable guide portion, the engaging member can be held in the engaging position, even when the operating force of the holding device stops acting on the engaging member; thus, the movable guide portion can be prevented from moving from the guiding position with the travel wheel of the article transport vehicle placed on the movable guide portion. Thus, the article transport vehicle can be prevented from derailing from the guide rail.

In addition, with one direction along the path longitudinal direction being defined to be a first direction, a direction along the path longitudinal direction that is opposite from the first direction being defined to be a second direction, and a direction that is perpendicular to the path longitudinal direction in plan view being defined to be a right and left direction, the guide rail is preferably one of guide rails that include a first rail member and a second rail member which are spaced apart from each other along the right and left direction, wherein each of the first rail member and the second rail member preferably has a travel surface on which a travel wheel of the article transport vehicle rolls, and an electricity supply line installed along the path longitudinal direction for supplying operating electric power to the article transport vehicle, wherein the movable guide portion is preferably one of movable guide portions that include a first movable guide portion of the first rail member and a second movable guide portion of the second rail member, wherein the fixed guide portion is preferably one of fixed guide portions that include a first fixed guide portion of the first rail member, and a second fixed guide portion of the second rail member, wherein the first movable guide portion is preferably pivotable about an axis that extends along the right and left direction and that is located in an end portion of the first movable guide portion that is on the first direction side, wherein the electricity supply line provided to the first movable guide portion is preferably connected with an electricity supply line provided to a portion of the first fixed guide portion that is adjacent to, lined up with, and extends away in the first direction from, the first movable guide portion in the guiding position and is preferably disconnected from an electricity supply line provided to a portion of the first fixed guide portion that is adjacent to, lined up with, and extends away in the second direction from, the first movable guide portion in the guiding position, wherein the second movable guide portion is preferably pivotable about an axis that extends along the right and left direction and that is located in an end portion of the second movable guide portion that is on the second direction side, and wherein the electricity supply line provided to the second movable guide portion is preferably connected with an electricity supply line provided to a portion of the second fixed guide portion that is adjacent to, lined up with, and extends away in the second direction from, the second movable guide portion in the guiding position and is preferably disconnected from an electricity supply line provided to a portion of the second fixed guide portion that is adjacent to, lined up with, and extends away in the first direction from, the second movable guide portion in the guiding position.

With the arrangement described above, in one of the pair of right and left rail members (the first rail member and the second rail member), the location along the path longitudinal direction at which the electricity supply line is disconnected can be located on one side of the door installation location along the path longitudinal direction. And, in the other of the pair of right and left rail members, the location along the path longitudinal direction at which the electricity supply line is disconnected can be located on the other side of the door installation location along the path longitudinal direction. Thus, the location in one of the pair of right and left rail members at which the electricity supply line is disconnected can be displaced along the path longitudinal direction from the location in the other of the pair of right and left rail members at which the electricity supply line is disconnected.

More specifically, the amount of electric power supplied from an electricity supply line to the article transport vehicle falls at the location at which the electricity supply line is discontinuous; thus, the amount of electric power supplied to the article transport vehicle temporarily falls by a large amount if the locations of discontinuity of the electricity supply lines are at the same position along the path longitudinal direction for both of the pair of the right and left rail members. However, by displacing, along the path longitudinal direction, the location in one of the pair of right and left rail members at which the electricity supply line is disconnected, from the location in the other of the pair of right and left rail members at which the electricity supply line is disconnected, the degree of reduction in the amount of electric power supplied to the article transport vehicle when traveling through the door installation location may be reduced.

In addition, the engaging member preferably includes an inserted portion for being inserted to an engaging recess portion of the fixed guide portion, wherein the inserted portion is preferably formed in a tapered shape in which a distal end side has a smaller transverse dimension than a proximal end side has in an inserting direction.

With the arrangement described above, by forming the inserted portion in a tapered shape, the gap formed between the engaging member and the engaging recess portion becomes larger as the engaging member is moved further from the engaging position toward the releasing position, thus, facilitating the movement of the inserted portion to its releasing position even when the inserted portion gets caught by the engaging recess portion.

What is claimed is:

1. An article transport facility comprising:
an article transport vehicle configured to travel along a travel path which extends through an opening formed in a wall;
a guide rail for guiding the article transport vehicle along the travel path;
a fire door for closing the opening through movement along a wall surface of the wall;
wherein the guide rail includes a movable guide portion capable of being located at a door installation location which is a location along a path longitudinal direction at which the fire door is installed and a fixed guide portion including two portions, one of which is located on one side of the door installation location and the other of which is located on the other side of the door installation location, along the path longitudinal direction,
wherein the movable guide portion is configured to be moved to a guiding position in which the movable guide portion is located at the door installation location, is adjacent to, and lined up with, the fixed guide portion, and to an out-of-the-way position in which the movable guide portion has been moved out of the door installation location for allowing passage of the fire door, wherein the movable guide portion is moved from the guiding position to the out-of-the-way position under a weight of the movable guide portion;
an engaging member capable of being moved to an engaging position at which the engaging member is in engagement with the movable guide portion in the guiding position and with the fixed guide portion to hold the movable guide portion in the guiding position, and to a releasing position at which the engaging member is not in engagement with at least one of the movable guide portion and the fixed guide portion, along a direction that intersects a direction in which the movable guide portion is moved from the guiding position under the weight of the movable guide portion wherein the engaging member supports the movable guide portion from below when in the engaging position;
an urging member for urging the engaging member from the engaging position toward the releasing position;
a holding device for generating an operating force with electric power supplied from an electric power supply to hold the engaging member in the engaging position against an urging force of the urging member;
a power-supply controller for controlling operation of the electric power supply; and
a fire detector for detecting a fire;
wherein the power-supply controller controls the operation of the electric power supply to:
maintain an electric power supplying state in which electric power is supplied from the electric power supply to the holding device while fire information which indicates a presence of a fire is not outputted from the fire detector; and
switch to an electric power non-supplying state in which electric power is not supplied from the electric power supply to the holding device if the fire information is outputted from the fire detector; and
wherein the guide rail has a travel surface on which a travel wheel of the article transport vehicle rolls,
wherein the engaging member is configured, when the operating force of the holding device is not acting on the engaging member:
to be movable from the engaging position to the releasing position under the urging force of the urging member when the travel wheel of the article transport vehicle is not on the movable guide portion; and
not to move from the engaging position to the releasing position under the urging force of the urging member when the travel wheel of the article transport vehicle is on the movable guide portion.

2. The article transport facility as defined in claim 1, wherein the engaging member is movable to the engaging position and to the releasing position by sliding along a slide path formed in, and extending at least partially through, the fixed guide portion and the movable guide portion, and
wherein the urging force of the urging member is set to be greater than a frictional force between the engaging member and the slide path when the travel wheel of the article transport vehicle is not on the movable guide portion, and to be less than the frictional force between the engaging member and the slide path when the travel wheel of the article transport vehicle is on the movable guide portion.

3. The article transport facility as defined in claim 1, wherein the engaging member includes an inserted portion for being inserted to an engaging recess portion of the fixed guide portion, and
wherein the inserted portion is formed in a tapered shape in which a distal end side has a smaller transverse dimension than a proximal end side in an inserting direction.

4. An article transport facility comprising:
an article transport vehicle configured to travel along a travel path which extends through an opening formed in a wall;
a guide rail for guiding the article transport vehicle along the travel path;
a fire door for closing the opening through movement along a wall surface of the wall;
wherein the guide rail includes a movable guide portion capable of being located at a door installation location which is a location along a path longitudinal direction at which the fire door is installed and a fixed guide portion including two portions, one of which is located on one side of the door installation location and the other of which is located on the other side of the door installation location, along the path longitudinal direction,
wherein the movable guide portion is configured to be moved to a guiding position in which the movable guide portion is located at the door installation location, is adjacent to, and lined up with, the fixed guide portion, and to an out-of-the-way position in which the movable guide portion has been moved out of the door installation location for allowing passage of the fire door, wherein the movable guide portion is moved from the guiding position to the out-of-the-way position under a weight of the movable guide portion;
an engaging member capable of being moved to an engaging position at which the engaging member is in engagement with the movable guide portion in the guiding position and with the fixed guide portion to hold the movable guide portion in the guiding position, and to a releasing position at which the engaging member is not in engagement with at least one of the movable guide portion and the fixed guide portion, along a direction that intersects a direction in which the movable guide portion is moved from the guiding position under the weight of the movable guide portion wherein the engaging member supports the movable guide portion from below when in the engaging position;

an urging member for urging the engaging member from the engaging position toward the releasing position;

a holding device for generating an operating force with electric power supplied from an electric power supply to hold the engaging member in the engaging position against an urging force of the urging member;

a power-supply controller for controlling operation of the electric power supply; and a fire detector for detecting a fire;

wherein the power-supply controller controls the operation of the electric power supply to:

maintain an electric power supplying state in which electric power is supplied from the electric power supply to the holding device while fire information which indicates a presence of a fire is not outputted from the fire detector; and switch to an electric power non-supplying state in which electric power is not supplied from the electric power supply to the holding device if the fire information is outputted from the fire detector;

wherein the electric power supply includes a main power source, an electricity storage, and a main power supply abnormal condition detector for detecting an abnormal condition of the main power source, and wherein the electric power supply is configured:

to cause electric power to be supplied from the main power source or the electricity storage to the holding device when in the electric power supplying state;

to cause electric power to be supplied from the electricity storage to the holding device when an abnormal condition of the main power source is detected by the main power supply abnormal condition detector, when in the electric power supplying state; and to cause electric power to be not supplied either from the main power source or from the electricity storage to the holding device when in the electric power non-supplying state.

5. An article transport facility comprising:

an article transport vehicle configured to travel along a travel path which extends through an opening formed in a wall;

a guide rail for guiding the article transport vehicle along the travel path;

a fire door for closing the opening through movement along a wall surface of the wall;

wherein the guide rail includes a movable guide portion capable of being located at a door installation location which is a location along a path longitudinal direction at which the fire door is installed and a fixed guide portion including two portions, one of which is located on one side of the door installation location and the other of which is located on the other side of the door installation location, along the path longitudinal direction, wherein the movable guide portion is configured to be moved to a guiding position in which the movable guide portion is located at the door installation location, is adjacent to, and lined up with, the fixed guide portion, and to an out-of-the-way position in which the movable guide portion has been moved out of the door installation location for allowing passage of the fire door, wherein the movable guide portion is moved from the guiding position to the out-of-the-way position under a weight of the movable guide portion;

an engaging member capable of being moved to an engaging position at which the engaging member is in engagement with the movable guide portion in the guiding position and with the fixed guide portion to hold the movable guide portion in the guiding position, and to a releasing position at which the engaging member is not in engagement with at least one of the movable guide portion and the fixed guide portion, along a direction that intersects a direction in which the movable guide portion is moved from the guiding position under the weight of the movable guide portion wherein the engaging member supports the movable guide portion from below when in the engaging position;

an urging member for urging the engaging member from the engaging position toward the releasing position;

a holding device for generating an operating force with electric power supplied from an electric power supply to hold the engaging member in the engaging position against an urging force of the urging member;

a power-supply controller for controlling operation of the electric power supply; and a fire detector for detecting a fire;

wherein the power-supply controller controls the operation of the electric power supply to:

maintain an electric power supplying state in which electric power is supplied from the electric power supply to the holding device while fire information which indicates a presence of a fire is not outputted from the fire detector; and switch to an electric power non-supplying state in which electric power is not supplied from the electric power supply to the holding device if the fire information is outputted from the fire detector;

wherein with one direction along the path longitudinal direction being defined to be a first direction, a direction along the path longitudinal direction that is opposite from the first direction being defined to be a second direction, and a direction that is perpendicular to the path longitudinal direction in plan view being defined to be a right and left direction, wherein the guide rail is one of guide rails that include a first rail member and a second rail member which are spaced apart from each other along the right and left direction, wherein each of the first rail member and the second rail member has a travel surface on which a travel wheel of the article transport vehicle rolls, and an electricity supply line installed along the path longitudinal direction for supplying operating electric power to the article transport vehicle, wherein the movable guide portion is one of movable guide portions that include a first movable guide portion of the first rail member and a second movable guide portion of the second rail member, wherein the fixed guide portion is one of fixed guide portions that include a first fixed guide portion of the first rail member, and a second fixed guide portion of the second rail member, wherein the first movable guide portion is pivotable about an axis that extends along the right and left direction and that is located in an end portion of the first movable guide portion that is on the first direction side, wherein the electricity supply line provided to the first movable guide portion is connected with an electricity supply line provided to a portion of the first fixed guide portion that is adjacent to, lined up with, and extends away in the first direction from, the first movable guide portion in the guiding position and is disconnected from an electricity supply line provided to a portion of the first fixed guide portion that is adjacent to, lined up with, and extends away in the second direction from, the first movable guide portion in the guiding position, wherein the second movable guide portion is pivotable about an axis that extends along the right and left direction and that is located in an end portion of the second movable guide portion that is on the second direction side, and wherein the electricity supply line provided to the second movable guide portion is connected with an electricity supply line provided to a portion of the second fixed guide portion that is adjacent to, lined up with, and extends away in the second direction from, the second movable guide portion in the guiding position and is disconnected from an electricity supply line provided to a portion of the second fixed guide portion that is adjacent to, lined up with, and extends away in the first direction from, the second movable guide portion in the guiding position.

* * * * *